US011560464B2

United States Patent
Katahira et al.

(10) Patent No.: US 11,560,464 B2
(45) Date of Patent: Jan. 24, 2023

(54) RESIN COMPOSITION, PRODUCTION METHOD FOR RESIN COMPOSITION, AND MOLDED BODY USING RESIN COMPOSITION

(71) Applicant: KURARAY CO., LTD., Kurashiki (JP)

(72) Inventors: Eriko Katahira, Okayama (JP); Hiroyuki Shimo, Zwijndrecht (BE); Kenji Nakano, Zwijndrecht (BE)

(73) Assignee: KURARAY CO., LTD., Kurashiki (JP)

( * ) Notice: Subject to any disclaimer, the term of this patent is extended or adjusted under 35 U.S.C. 154(b) by 396 days.

(21) Appl. No.: 16/494,000

(22) PCT Filed: Mar. 14, 2018

(86) PCT No.: PCT/JP2018/009891
§ 371 (c)(1),
(2) Date: Sep. 13, 2019

(87) PCT Pub. No.: WO2018/168903
PCT Pub. Date: Sep. 20, 2018

(65) Prior Publication Data
US 2020/0385546 A1 Dec. 10, 2020

(30) Foreign Application Priority Data
Mar. 15, 2017 (JP) .............................. JP2017-050556

(51) Int. Cl.
| | |
|---|---|
| B32B 7/12 | (2006.01) |
| B32B 27/08 | (2006.01) |
| B32B 27/32 | (2006.01) |
| B32B 27/22 | (2006.01) |
| B32B 27/34 | (2006.01) |
| B32B 27/20 | (2006.01) |
| B32B 27/36 | (2006.01) |
| B32B 27/40 | (2006.01) |
| C08K 5/20 | (2006.01) |
| C08K 5/06 | (2006.01) |
| C08K 5/17 | (2006.01) |
| C08J 5/18 | (2006.01) |
| C08L 29/04 | (2006.01) |
| C08K 3/105 | (2018.01) |
| B32B 27/30 | (2006.01) |
| C08K 5/103 | (2006.01) |

(52) U.S. Cl.
CPC ............. C08K 5/20 (2013.01); B32B 7/12 (2013.01); B32B 27/08 (2013.01); B32B 27/306 (2013.01); B32B 27/32 (2013.01); C08K 3/105 (2018.01); C08K 5/06 (2013.01); C08K 5/103 (2013.01); B32B 2250/05 (2013.01); B32B 2250/24 (2013.01)

(58) Field of Classification Search
None
See application file for complete search history.

(56) References Cited

U.S. PATENT DOCUMENTS

| | | | |
|---|---|---|---|
| 6,485,842 B1 | 11/2002 | Shindome et al. | |
| 2005/0147778 A1 | 7/2005 | Tai et al. | |
| 2006/0292323 A1* | 12/2006 | Hutchinson | C08J 7/048 |
| | | | 428/36.91 |
| 2008/0279905 A1* | 11/2008 | Kawamoto | A41D 31/14 |
| | | | 424/402 |
| 2010/0255330 A1 | 10/2010 | Ninomiya et al. | |
| 2012/0052225 A1 | 3/2012 | Kani et al. | |
| 2012/0248640 A1 | 10/2012 | Tsuboi et al. | |
| 2013/0018133 A1 | 1/2013 | Yamasaki et al. | |
| 2017/0183426 A1 | 6/2017 | Kawai et al. | |

FOREIGN PATENT DOCUMENTS

| | | |
|---|---|---|
| CN | 1649956 A | 8/2005 |
| CN | 101809082 A | 8/2010 |
| CN | 102229733 A | 11/2011 |
| CN | 102449362 A | 5/2012 |
| JP | 55-86829 A | 7/1980 |
| JP | 57-61025 A | 4/1982 |
| JP | 57-61036 A | 4/1982 |
| JP | 1-308440 A | 12/1989 |
| JP | 2-99546 A | 4/1990 |
| JP | 2001-146539 A | 5/2001 |
| JP | 2002-30195 A | 1/2002 |
| JP | 2006-188656 A | 7/2006 |
| JP | 2006-249407 A | 9/2006 |
| JP | 2013-193759 A | 9/2013 |
| TW | 201307446 A1 | 2/2013 |
| TW | 201615674 A | 5/2016 |
| WO | WO 2011/118648 A1 | 9/2011 |
| WO | WO 2011/132592 A1 | 10/2011 |
| WO | WO 2013/146458 A1 | 10/2013 |

OTHER PUBLICATIONS

Taiwanese Search Report dated Jun. 4, 2021 in Taiwanese Patent Application No. 107108810, 2 pages.
International Search Report dated Jun. 19, 2018 in PCT/JP2018/009891 filed on Mar. 14, 2018.

\* cited by examiner

*Primary Examiner* — Sheeba Ahmed
(74) *Attorney, Agent, or Firm* — Oblon, McClelland, Maier & Neustadt, L.L.P.

(57) ABSTRACT

There is provided a resin composition, comprising an ethylene-vinyl alcohol copolymer and a nonionic surfactant, wherein the ethylene-vinyl alcohol copolymer has an ethylene unit content of 15 to 60 mol %, and a saponification degree of 90 mol % or more; the ethylene-vinyl alcohol copolymer is contained as a major component; and the nonionic surfactant is contained at 3 to 400 ppm. The resin composition is produced by melt-kneading a mixture comprising the nonionic surfactant, water and the ethylene-vinyl alcohol copolymer. By using the resin composition thus produced, a discharge amount during melt molding can be increased and a molded article with an excellent appearance can be provided.

10 Claims, No Drawings

RESIN COMPOSITION, PRODUCTION METHOD FOR RESIN COMPOSITION, AND MOLDED BODY USING RESIN COMPOSITION

TECHNICAL FIELD

The present invention relates to a resin composition containing an ethylene-vinyl alcohol copolymer, a production method therefor and a molded article therefrom.

BACKGROUND ART

An ethylene-vinyl alcohol copolymer (hereinafter, sometimes abbreviated as "EVOH") is a polymer material which is excellent in gas shield such as oxygen, transparency, aroma retention, oil resistance, antistatic property, mechanical strength and so on. EVOH has been, therefore, extensively used as a material for a molded article such as a container. A molded article made of EVOH is generally produced by melt molding. Thus, for EVOH, it is needed, for example, that productivity is improved in melt molding and a product obtained by melt molding has an excellent appearance (without discoloration such as yellowing).

Patent Reference No. 1 has proposed a resin composition comprising EVOH, hydrotalcite and a metal salt of a higher fatty acid. It has described that by the use of the resin composition, a discharge amount during melt molding is so increased that a production efficiency is improved and also a high-quality molded article such as a film with less blocking or fisheyes. There is, however, a problem that a molded article obtained by melt molding the above resin composition may be sometimes discolored.

Patent Reference Nos. 2 and 3 have proposed various resin compositions wherein EVOH contains an acid such as a carboxylic acid and phosphoric acid or a metal salt thereof such as an alkali metal salt and an alkaline-earth metal salt. Furthermore, Patent Reference Nos. 2 and 3 have described that these resin compositions are excellent in appearance and stability during melt molding. However, with these resin compositions, productivity in melt molding is sometimes unsatisfactory.

Patent Reference No. 4 has described a package for fruit and vegetables which contains EVOH film having 0.3% by weight or more of a surfactant. Patent Reference No. 4 has described that combination of EVOH with a surfactant allows for eliminating dew drop in a package for fruit and vegetables without wilting of fruit and vegetables. However, when a package for fruit and vegetables described in Patent Reference No. 4 is produced, productivity of melt molding is unsatisfactory and a molded article obtained by melt molding has poor appearance.

PRIOR ART REFERENCES

Patent References

Patent Reference No. 1: JP 01-308440 A
Patent Reference No. 2: JP 2001-146539 A
Patent Reference No. 3: WO 2011/118648 A1
Patent Reference No. 4: JP 2013-193759 A

SUMMARY OF THE INVENTION

Problems to be Solved by the Invention

The present invention has been made to solve the above described problems and an objective of the present invention is to provide a resin composition whereby a discharge amount during melt molding can be increased and a molded article having an excellent appearance can be provided, and a production method therefor. Another objective of the present invention is to provide a molded article and a multilayer structure formed by the use of such a resin composition.

Means for Solving the Problems

The above problems can be solved by providing a resin composition, comprising an ethylene-vinyl alcohol copolymer and a nonionic surfactant, wherein the ethylene-vinyl alcohol copolymer has an ethylene unit content of 15 to 60 mol %, and a saponification degree of 90 mol % or more; the ethylene-vinyl alcohol copolymer is contained as a major component; and the nonionic surfactant is contained at 3 to 400 ppm.

Preferably, the nonionic surfactant is at least one selected from the group consisting of ether, aminoether, ester, ester/ether and amide types. More preferably, the nonionic surfactant is at least one selected from the group consisting of polyoxyalkylene alkyl ethers, polyoxyalkylene alkenyl ethers, polyoxyethylene styrenated-phenyl ethers, polyoxyalkylenealkylamines, polyoxyalkylenealkenylamines, polyoxyalkylene alkyl esters, polyoxyalkylene alkenyl esters, sorbitan alkyl esters, sorbitan alkenyl esters, polyoxyethylene sorbitan alkyl esters, polyoxyethylene sorbitan alkenyl esters, glycerol alkyl esters, glycerol alkenyl esters, polyglycerol alkyl esters, polyglycerol alkenyl esters and higher fatty acid amides.

It is also preferably that the resin composition further comprises an alkali metal salt at 10 to 500 ppm in terms of the metal element.

It is also preferably that the resin composition further comprises at least one additive selected from the group consisting of an antioxidant, an ultraviolet absorber, a plasticizer, an antistatic, a lubricant and a filler at 0.005 to 1% by mass.

It is also preferably that the resin composition comprises two EVOHs having different ethylene unit contents as the EVOH.

A preferable embodiment of the present invention is a molded article comprising the resin composition. Another preferable embodiment of the present invention is a multilayer structure comprising a layer made of the resin composition and a layer made of a thermoplastic resin other than the EVOH.

The above problems can be also solved by providing a method for producing the resin composition, comprising melt-kneading a mixture comprising the nonionic surfactant, water and the EVOH. Here, preferably, in the mixture, a water content is 0.1 to 50 parts by mass based on 100 parts by mass of the EVOH. It is also preferably that an aqueous solution or an aqueous dispersion containing the nonionic surfactant is added to the EVOH to give the mixture.

Effects of the Invention

A resin composition of the present invention has an excellent appearance. Furthermore, by using the resin composition, a discharge amount during melt molding is increased. In particular, a constant discharge amount can be ensured even at a lower temperature. By using such a resin composition, a molded article or a multilayer structure having an excellent appearance can be produced with higher productivity. Furthermore, in accordance with the production method of the present invention, the resin composition can be conveniently produced.

MODES FOR CARRYING OUT THE INVENTION

There will be detailed a resin composition, a molded article and a multilayer structure of the present invention.
[Resin Composition]

A resin composition of the present invention comprises an ethylene-vinyl alcohol copolymer and a nonionic surfactant, wherein the ethylene-vinyl alcohol copolymer has an ethylene unit content of 15 to 60 mol %, and a saponification degree of 90 mol % or more; the ethylene-vinyl alcohol copolymer is contained as a major component; and the nonionic surfactant is contained at 3 to 400 ppm.
(EVOH)

EVOH contained in the resin composition of the present invention is a copolymer containing ethylene units and vinyl alcohol units. The EVOH can be produced by a known method. For example, ethylene and a vinyl ester are copolymerized to give an ethylene-vinyl ester copolymer, and the copolymer is then saponified by the use of, for example, an alkali catalyst, to give the EVOH. Examples of the vinyl ester include fatty acid vinyl esters such as vinyl acetate, vinyl propionate and vinyl pivalate, preferably vinyl acetate. The EVOH can contain a copolymerizable component other than ethylene or vinyl alcohol as long as the effects of the present invention are not deteriorated. An example of such a copolymerizable component is a unit derived from a vinyl silane compound. Here, examples of the unit derived from a vinyl silane compound include units derived from vinyltrimethoxysilane, vinyltriethoxysilane, vinyltri(β-methoxyethoxy)silane or γ-methacryloxypropylmethoxysilane. Among these, preferred is a unit derived from vinyltrimethoxysilane or vinyltriethoxysilane. Furthermore, the EVOH can contain, as another copolymerizable component, a unit derived from an α-olefin such as propylene and butene; an unsaturated carboxylic acid or an ester thereof such as (meth)acrylic acid and methyl (meth)acrylate; and a vinyl pyrrolidone such as N-vinylpyrrolidone. A content of a copolymerizable component other than an ethylene unit or a vinyl alcohol unit in the EVOH is preferably 10 mol % or less, more preferably 5 mol % or less, further preferably 1 mol % or less.

It is necessary that an ethylene unit content in the EVOH is 15 to 60 mol %. It can allow for producing a resin composition having good balance between excellent melt moldability and excellent gas barrier property. If the ethylene content is less than 15 mol %, long run property is deteriorated during melt molding of the resin composition and a molded article produced is deteriorated in water resistance, hot water resistance and gas barrier property under high humidity. The ethylene content is preferably 20 mol % or more, more preferably more than 20 mol %, further preferably 22 mol % or more. If the ethylene content is more than 60 mol %, a molded article obtained is deteriorated in gas barrier property. Thus, the ethylene content is preferably 50 mol % or less.

It is necessary that the EVOH has a saponification degree of 90 mol % or more. It allows for providing a resin composition having excellent gas barrier property. If the saponification degree is less than 90 mol %, a molded article obtained is deteriorated in gas barrier property and has poor appearance. The saponification degree is preferably 95 mol % or more, more preferably 99 mol % or more. An ethylene unit content and a saponification degree of the EVOH can be determined by $^1$H-NMR spectroscopy using DMSO-$d_6$ as a solvent.

A melt flow rate (temperature: 210° C., load: 2160 g; hereinafter, a melt flow rate is abbreviated as "MFR") of the EVOH is preferably 0.1 to 200 g/10 min. With an MFR of the EVOH within the range, moldability and processibility of the resin composition, and appearance of a molded article obtained are improved. An MFR of the EVOH is more preferably 0.5 g/10 min or more, further preferably 1 g/10 min or more, particularly preferably 3 g/10 min or more. An MFR of the EVOH is more preferably 50 g/10 min or less, further preferably 30 g/10 min or less, particularly preferably 15 g/10 min or less, most preferably 10 g/10 min or less. In the present invention, a melt flow rate is determined in accordance with JIS K 7210.

The EVOH can be a mixture of two or more EVOHs. Here, an ethylene content, a saponification degree and MFR are averages calculated from a blend mass ratio. In the light of a production cost and uniformity of a product obtained, a resin composition of the present invention preferably contains one EVOH. In contrast, in the light of good balance between barrier property and various mechanical properties, a resin composition of the present invention preferably contains two EVOHs having different ethylene unit contents. Here, a difference in an ethylene unit content between two EVOHs is preferably 5 mol % or more, more preferably 10 mol % or more. Furthermore, a mass ratio of an EVOH with a higher ethylene unit content to an EVOH with a lower ethylene unit content is preferably 1/99 to 99/1, more preferably 5/95 to 95/5.

A resin composition of the present invention contains the EVOH as a main component. Here, a main component denotes the most abundant component by mass. A content of the EVOH in the resin composition of the present invention is preferably 55% by mass or more. If the content is less than 55% by mass, gas barrier property or moldability of the resin composition may be insufficient. The content is preferably 80% by mass or more, further preferably 90% by mass or more, particularly preferably 95% by mass or more, most preferably 99% by mass or more.
(Nonionic Surfactant)

A resin composition of the present invention contains a nonionic surfactant at 3 to 400 ppm. By using the resin composition containing a predetermined amount of a nonionic surfactant, a discharge amount of a resin in melt molding can be increased. In particular, even when the resin composition contains components other than the EVOH, a discharge amount of a resin can be increased without influence of the other components and a constant discharge amount can be ensured even when a molten resin is at a lower temperature. Furthermore, surprisingly, a predetermined amount of a nonionic surfactant in the resin composition prevents discoloration of the resin composition during melt molding. Although details are not clear, the followings can be supposed. It is known that generally, when an EVOH contains metal ions, the metal ions react with the EVOH, accelerating thermal deterioration of the EVOH and leading to discoloration (for example, yellowing) of the EVOH. Presumably, such a reaction might be inhibited by the nonionic surfactant, resulting in prevention of thermal deterioration of the EVOH.

A nonionic surfactant contained in the resin composition is preferably at least one selected from the group consisting of, but not limited to, ether, aminoether, ester, ester/ether and amide types. These nonionic surfactants can be used alone or in combination of two or more.

The ether type nonionic surfactant is preferably polyoxyalkylene alkyl ether, polyoxyalkylene alkenyl ether or polyoxyethylene styrenated-phenyl ether.

A polyoxyalkylene alkyl ether and a polyoxyalkylene alkenyl ether preferably have Formula (1):

$$R\text{—}O\text{-}(AO)_nH \qquad (1).$$

In the formula, R is a straight- or branched-chain alkyl or alkenyl group having 6 to 22 carbon atoms; A is independently of each other an alkylene group having 2 to 4 carbon atoms; n represents a condensation degree of polyoxyalkylene units and is 1 to 30.

In Formula (1), the carbon number of R is preferably 8 to 18. The carbon number of A is preferably 2 or 3. Then, n is preferably 2 to 25, more preferably 3 to 20.

Specific examples of a polyoxyalkylene alkyl ether include polyoxyethylene alkyl ethers such as polyoxyethylene hexyl ether, polyoxyethylene heptyl ether, polyoxyethylene octyl ether, polyoxyethylene-2-ethyl hexyl ether, polyoxyethylene nonyl ether, polyoxyethylene decyl ether, polyoxyethylene lauryl ether, polyoxyethylene tetradecyl ether, polyoxyethylene cetyl ether, polyoxyethylene stearyl ether and polyoxyethylene icosyl ether; polyoxypropylene alkyl ethers such as polyoxypropylene stearyl ether; and polyoxyethylenepolyoxy propylenealkyl ether.

Specific examples of a polyoxyalkylene alkenyl ether include polyoxyethylene alkenyl ethers such as polyoxyethylene oleyl ether.

Specific examples of a polyoxyethylene styrenated-phenyl ether include polyoxyethylene monostyrenated-phenyl ether, polyoxyethylene distyrenated-phenyl ether, and polyoxyethylene tristyrenated-phenyl ether. The ethylene-oxide addition number of the polyoxyethylene styrenated-phenyl ether is suitably 5 to 30 moles.

The aminoether type nonionic surfactant is preferably polyoxyalkylenealkylamine, polyoxyalkylenealkenylamine or the like. Preferable examples of a polyoxyalkylenealkylamine include cocoalkylamine-ethylene oxide adduct, polyoxyethylenestearylamine, polyoxyethylenelaurylamine, polyoxyethylenepolyoxypropylenelaurylamine, and polyoxyethylenestearylamine. A polyoxyalkylenealkenylamine is preferably polyoxyethyleneoleylamine or the like. The ethylene-oxide addition number of the polyoxyalkylenealkylamine is preferably 1 to 40 moles.

Preferable examples of the ester type nonionic surfactant include a polyoxyalkylene alkyl ester, a polyoxyalkylene alkenyl ester, a sorbitan alkyl ester, a sorbitan alkenyl ester, a polyoxyethylenesorbitan alkyl ester, a polyoxyethylenesorbitan alkylene ester, a glycerol alkyl ester, a glycerol alkenyl ester, a polyglycerol alkyl ester, and a polyglycerol alkenyl ester.

The polyoxyalkylene alkyl ester and the polyoxyalkylene alkenyl ester preferably have Formula (2):

$$R\text{—}COO(AO)_nH \qquad (2).$$

In the formula, R, A and n are as defined in Formula (1). Preferable ranges are 8 to 18 for the carbon number of R, 2 or 3 for the carbon number of A; and 7 to 14 for n. With n being within the above range, there can be good balance between an improved discharge amount and appearance.

Specific examples of a polyoxyalkylene alkyl ester include polyoxyethylene monolaurate, polyoxyethylene dilaurate, polyoxyethylene monopalmitate, polyoxyethylene monostearate and polyoxyethylene distearate.

Specific examples of a polyoxyalkylene alkenyl ester include polyoxyethylene oleate and polyethyleneglycol dioleate.

Specific examples of a sorbitan alkyl ester preferably include sorbitan monocaprylate, sorbitan monolaurate, sorbitan monopalmitate, sorbitan monostearate, sorbitan distearate, sorbitan tristearate, and sorbitan monolaurate.

Specific examples of a sorbitan alkenyl ester preferably include sorbitan monooleate, sorbitan trioleate, and sorbitan sesquioleate.

Specific examples of a polyoxyethylenesorbitan alkyl ester include polyoxyethylenesorbitan monolaurate, polyoxyethylenesorbitan monopalmitate, polyoxyethylenesorbitan monostearate, polyoxyethylenesorbitan tristearate, polyoxyethylenesorbitan triisostearate, and polyoxyethylenesorbitan monolaurate.

Specific examples of a polyoxyethylenesorbitan alkenyl ester include polyoxyethylenesorbitan monooleate, and polyoxyethylenesorbitan trioleate.

Specific examples of a glycerol alkyl ester include glycerol monostearate, and glycerol monomyristate.

A specific example of a glycerol alkenyl ester is glycerol monooleate.

Specific examples of a polyglycerol alkyl ester include diglycerol laurate, tetraglycerol stearate, polyglycerol laurate, and polyglycerol stearate.

A specific example of a polyglycerol alkenyl ester is polyglycerol oleate.

The ester/ether type nonionic surfactant is preferably a polyoxyethylenesorbitan alkyl ester, a polyoxyethylenesorbitan alkenyl ester or the like.

The amide type nonionic surfactant is preferably a higher fatty acid amide, more preferably a higher fatty acid alkanolamide.

A higher fatty acid alkanolamide can be a higher fatty acid mono- or di-alkanolamide; specific examples include caproic acid mono- or di-ethanolamide, caprylic acid mono- or di-ethanolamide, capric acid mono- or di-ethanolamide, lauric acid mono- or di-ethanolamide, palmitic acid mono- or di-ethanolamide, stearic acid mono- or di-ethanolamide, oleic acid mono- or di-ethanolamide, coconut oil fatty acid mono- or di-ethanolamide, and those containing propanolamide or butanolamide instead of ethanolamide as a component.

Examples of a higher fatty acid amide other than a higher fatty acid alkanolamide include caproic acid amide, caprylic acid amide, capric acid amide, lauric acid amide, palmitic acid amide, stearic acid amide and oleic acid amide.

More preferable examples of a nonionic surfactant include at least one selected from the group consisting of a polyoxyalkylene alkyl ether, a polyoxyalkylene alkenyl ether, a polyoxyethylene styrenated-phenyl ether, a polyoxyalkylenealkylamine, a polyoxyalkylenealkenylamine, a polyoxyalkylene alkyl ester, a polyoxyalkylene alkenyl ester, a sorbitan alkyl ester, a sorbitan alkenyl ester, a polyoxyethylene sorbitan alkyl ester, a polyoxyethylene sorbitan alkenyl ester, a glycerol alkyl ester, a glycerol alkenyl ester, a polyglycerol alkyl ester, a polyglycerol alkenyl ester and a higher fatty acid amide.

In the light of producing a molded article having particularly excellent appearance, a nonionic surfactant is preferably an ether or ester type. Among these, in the light of discoloration, more preferred is at least one selected from the group consisting of a polyoxyalkylene alkyl ether, a polyoxyalkylene alkenyl ether, a polyoxyalkylene alkyl ester, a polyoxyalkylene alkenyl ester, a glycerol alkyl ester, a polyglycerol alkyl ester and a polyglycerol alkenyl ester. These can be used alone or in combination of two or more.

A content of a nonionic surfactant in a resin composition of the present invention is 3 to 400 ppm. If the content is less than 3 ppm, a discharge amount of the resin composition is not sufficiently increased and discoloration is not sufficiently inhibited. The content is preferably 10 ppm or more, more preferably 50 ppm or more. If the content is more than 400 ppm, it is economically disadvantageous, and a resin is insufficiently fed to an extruder due to resin sliding, so that a discharge amount of the resin composition is reduced and a residence time of the resin composition in an extruder becomes longer, leading to tendency to resin yellowing. The content is preferably 300 ppm or less, more preferably 150 ppm or less.

(Alkali Metal Salt)

Preferably, the resin composition further contains an alkali metal salt. A resin composition containing such an alkali metal salt exhibits adhesiveness to another resin. Particularly, interlayer adhesiveness is improved in a multilayer structure having a layer made of the resin composition and a layer made of a thermoplastic resin other than the ethylene-vinyl alcohol copolymer. Furthermore, surprisingly, a predetermined amount of a nonionic surfactant added can improve adhesiveness while preventing thermal deterioration of an EVOH by an alkali metal salt.

Examples of an alkali metal which forms the above alkali metal salt include lithium, sodium and potassium, preferably sodium and potassium. Examples of the alkali metal salt include lithium, sodium or potassium aliphatic carboxylate, aromatic carboxylate, carbonate, hydrochloride, nitrate, sulfate, phosphate, metal complex or the like. Among these, more preferred are sodium acetate, potassium acetate, sodium carbonate, potassium carbonate, sodium phosphate and potassium phosphate in the light of availability.

A resin composition of the present invention preferably contains an alkali metal salt at 10 to 500 ppm in terms of the metal element. A content of the alkali metal salt is more preferably 30 ppm or more, further preferably 100 ppm or more. Furthermore, the content is more preferably 400 ppm or less, further preferably 300 ppm or less. With the content of the alkali metal salt being the lower limit or more, interlayer adhesiveness can be improved when the resin composition is used as a material constituting a layer of the multilayer structure. With the content of the metal salt being the upper limit or less, discoloration of the resin composition can be prevented.

(Other Components)

As long as the effects of the present invention are not inhibited, the resin composition can contain components other than the EVOH or the nonionic surfactant. A content of the other components in the resin composition is preferably 0.005 to 45% by mass. The content is more preferably 20% by mass or less, further preferably 10% by mass or less, particularly preferably 5% by mass or less, most preferably 1% by mass or less. Here, when two or more components are used, the total content can be within the above range.

The resin composition preferably contains at least one additive selected from the group consisting of an antioxidant, an ultraviolet absorber, a plasticizer, an antistatic, a lubricant and a filler. A content of the additive in the resin composition is preferably 0.005 to 50% by mass. The content is more preferably 20% by mass or less, further preferably 10% by mass or less, particularly preferably 5% by mass or less, most preferably 1% by mass or less.

Examples of the antioxidant include N,N'-hexane-1,6-diylbis[3-(3,5-di-tert-butyl-4-hydroxyphenyl)propionamide], N,N'-1,6-hexanediylbis{N-(2,2,6,6-tetramethyl-4-piperidinyl)-formamide}, 2,5-di-t-butylhydroquinone, 2,6-di-2,2'-methylene-bis-(4-methyl-6-t-butylphenol), octadecyl-3-(3',5'-di-t-butyl-4'-hydroxyphenyl) propionate, and 4,4'-thiobis-(6-t-butylphenol).

Examples of the ultraviolet absorber include ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl)-5-chlorobenzotriazole, 2-hydroxy-4-m ethoxybenzophenone, 2,2'-dihydroxy-4-methoxybenzophenone, and 2-hydroxy-4-octoxybenzophenone.

Examples of the plasticizer include dimethyl phthalate, diethyl phthalate, dioctyl phthalate, wax, liquid paraffin and phosphoric acid esters.

Examples of the antistatic include pentaerythritol monostearate, sorbitan monopalmitate, sulfated polyolefins, polyethylene oxide, and polyethylene glycol (trade name: Carbowax).

Examples of the lubricant include ethylenebisstearamide and butyl stearate.

Examples of the filler include glass fiber, wollastonite, calcium silicate, talk and montmorillonite.

The resin composition can contain a thermoplastic resin other than an EVOH as another component. Examples of the thermoplastic resin include polyolefins [polyethylene, polypropylene, poly(l-butene), poly(4-methyl-1-pentene), ethylene-propylene copolymer, a copolymer of ethylene with an α-olefin having 4 or more carbon atoms, a copolymer of an olefin with maleic anhydride, ethylene-vinyl ester copolymer, ethylene-acrylic acid ester copolymer, a modified polyolefin which is graft-modified with an unsaturated carboxylic acid or a derivative thereof, or the like]; Nylons (Nylon 6, Nylon 66, Nylon 6/66 copolymer or the like); polyvinyl chloride; polyvinylidene chloride; polyesters; polystyrene; polyacrylonitrile; polyurethane; polyacetal; and a modified polyvinyl alcohol. A content of the thermoplastic resin other than an EVOH in the resin composition is preferably 45% by mass or less, more preferably 20% by mass or less, further preferably 10% by mass or less, particularly preferably 5% by mass or less, most preferably 1% by mass or less.

In the light of thermostability and viscosity control, the resin composition can contain various compounds such as an acid as other components. This compound can be a carboxylic acid, a phosphate compound and a boron compound. Specific examples include the followings. These compounds can be preliminarily contained in the EVOH.

Carboxylic acid: oxalic acid, succinic acid, benzoic acid, citric acid, acetic acid, lactic acid and the like Phosphate compound: various acids such as phosphoric acid and phosphorous acid and salts thereof, and the like Boron compound: boric acid, boric acid ester, boric acid salt, boron hydride and the like An MFR of the resin composition is preferably within the same range as the EVOH. The resin composition having an MFR within such a range is as effective as the EVOH.

(Production Method of a Resin Composition)

An example of a method for producing a resin composition of the present invention is, but not limited to, a method comprising melt-kneading a mixture of the EVOH, the nonionic surfactant and, if necessary, the other components.

The EVOH, the nonionic surfactant and the like can be melt-kneaded using a known mixing or kneading machine such as a kneader-ruder, an extruder, a mixing roll and a Bunbary mixer. Examples of an aspect of a nonionic surfactant include a solid such as powder, a molten material, a solution such as an aqueous solution, and a dispersion such as an aqueous dispersion. A nonionic surfactant of such an aspect can be mixed with the EVOH and the other components. A preferable aspect of a nonionic surfactant is a solution and a dispersion. A temperature during melt-kneading a mixture containing the EVOH, a nonionic surfactant and the like can be appropriately adjusted, depending on a melting point of the EVOH used, generally 120° C. to 300° C.

The resin composition is preferably produced by melt-kneading a mixture of the nonionic surfactant, water and the EVOH. A water content of the mixture is preferably 0.1 to 50 parts by mass, more preferably 0.5 to 50 parts by mass, based on 100 parts by mass of the EVOH. If the content is less than 0.1 parts by mass, a resin composition produced may tend to be discolored. If the content is more than 50 parts by mass, the EVOH and water are phase-separated, so that foaming may tend to occur in the resin composition discharged from an extruder. A water content of the mixture means that for the whole composition added alone and in combination with other components, and includes water contained in the nonionic surfactant and the EVOH by moisture absorption and the like. Examples of a method for adding water together with the other components include a method wherein an aqueous solution or an aqueous dispersion is used as the nonionic surfactant, and a method wherein an EVOH containing a predetermined amount of water is used as the EVOH, as described below.

In the above production method, it is preferable that the mixture is prepared by adding an aqueous solution or an aqueous dispersion containing the nonionic surfactant to the EVOH. By adding the nonionic surfactant as the aqueous solution or the aqueous dispersion, dispersion of the nonionic surfactant in the EVOH is promoted.

In the above production method, the nonionic surfactant can be added to the EVOH before melting, or the nonionic surfactant can be added to the molten EVOH. The latter is preferable in the light of productivity.

A method for melt-kneading a mixture containing the nonionic surfactant, water and the EVOH can be, for example, a method wherein the EVOH is introduced into an extruder, a nonionic surfactant and, if necessary, other components are added to the molten EVOH, and the mixture is kneaded and then discharged. Here, the EVOH having a water content of 5 to 40% by mass can be introduced into an extruder.

[Molded Article]

A molded article containing a resin composition thus obtained is a suitable embodiment of the present invention. The molded article can be made of the resin composition alone or can have a part made of the resin composition and a part made of a component or components other than the resin composition.

Examples of a molded article comprising the resin composition include pellets, films, sheet, containers (bags, cups, tubes, trays, bottles and the like), fuel canisters, pipes, fibers, packaging materials for drinks/foods, packing materials for a container, materials for a medical infusion bag, materials for a tire tube, cushion materials for shoes, materials for an inner pouch for a bag in box, materials for a tank for storing an organic liquid, materials for a pipe for transporting an organic liquid, materials for a hot-water pipe for heating (materials for a hot-water pipe for floor heating and the like), packaging materials for cosmetics, packaging materials for dental care products, packaging materials for medicinal products, subparts for packaging materials (caps, cock parts in a bag in box and the like), pesticide bottles, agricultural films (films for greenhouse, films for soil fumigation), bags for cereal storing, geomembranes, wallpapers or decorative laminates, and gas tanks for hydrogen, oxygen or the like. Examples of the fuel container include fuel containers mounted on an automobile, a motorbike, a ship, an aircraft, a dynamo, an industrial equipment, an agricultural equipment or the like; portable containers for supplying the fuel container with fuel; and containers for fuel storing. Examples of a fuel include gasoline, typically gasoline blended with methanol, ethanol, MTBE or the like, that is, oxygenated gasoline; further, heavy oil, light oil, kerosene and the like.

The molded articles are usually produced by melt-molding the resin composition. These molded articles can be pulverized for the purpose of reuse and then remolded. A film, sheet, fiber or the like can be formed by uniaxial or biaxial drawing. Melt molding can be conducted by any known molding method including extrusion molding, inflation extrusion, blow molding, melt spinning and injection molding. A melting temperature during melt molding is preferably 150 to 300° C., more preferably 200 to 250° C. The use of a resin composition of the present invention can prevent discoloration after melt molding (for example, yellowing), generation of gel, particles, fisheyes and scratches. Therefore, a molded article produced by melt molding the resin composition has excellent appearance. Generally, in film production, an EVOH-containing composition is heated in a compression section and a metering section at a relatively higher temperature in order to ensure a constant discharge amount; for example, feeding section/compression section/metering section/die are at 175° C./200° C./210° C./210° C., respectively. However, the use of the above resin composition allows for ensuring a constant discharge amount even under a low-temperature conditions that the feeding section and the compression section are at a lower temperature by 10° C. or more than an ordinary operating temperature thereof.

The molded article is preferably a multilayer structure having a layer made of the resin composition and a layer made of a thermoplastic resin other than an EVOH. The resin composition has excellent long run property and allows for preventing discoloration after melt molding such as yellowing and generation of gel, particles, fisheyes, scratches and the like. Therefore, the resin composition and the other thermoplastic resin can be used for melt molding, so that a multilayer structure having excellent appearance can be produced with excellent productivity.

There are no particular restrictions to a thickness configuration of the multilayer structure, but in the light of moldability, a cost and the like, a thickness ratio of the resin composition layer to the total layer thickness is suitably 2 to 20%. Examples of a layer configuration of the multilayer structure include, but not limited to, A/B, A/B/A, A/C/B, A/C/B/C/A, A/B/A/B/A, A/C/B/C/A/C/B/C/A, wherein A represents another thermoplastic resin layer, B represents the resin composition layer and C represents an adhesive resin layer. Additional layers can be formed to these. In case of a plurality of other thermoplastic resin layers, these can be different or the same. Furthermore, a recovered resin layer made of a scrap such as trim formed during molding can be separately formed, or the other thermoplastic resin layer can be a layer made of a blend of a recovered resin and another thermoplastic resin.

The adhesive resin is preferably a carboxylic acid-modified polyolefin. A carboxylic acid-modified polyolefin which can be suitably used, is a modified olefinic polymer containing a carboxyl group formed by chemically binding (for example, addition reaction, graft reaction and the like) an ethylenic unsaturated carboxylic acid or an ester or anhydride thereof to an olefinic polymer. Examples of ethylenic unsaturated carboxylic acid or an ester or anhydride thereof include maleic acid, fumaric acid, itaconic acid, maleic anhydride, itaconic anhydride, maleic acid monomethyl ester, maleic acid monoethyl ester, diethyl maleate and fumaric acid monomethyl ester, more preferably maleic anhydride. These adhesive layers can be used alone or in combination of two or more.

Examples of the other thermoplastic resin include polyolefins such as straight-chain low-density polyethylene, low-density polyethylene, medium-density polyethylene, high-density polyethylene, ethylene-vinyl acetate copolymer, ethylene-propylene copolymer, polypropylene, propylene-α-olefin copolymer, polybutene and polypentene; polyesters such as polyethylene terephthalate; polyester elastomers; polyamides such as Nylon 6 and Nylon 66; polystyrene; polyvinyl chloride; polyvinylidene chloride; acrylic resins; vinyl ester resins; polyurethane elastomers; polycarbonates; polyethylene chloride; and polypropylene chloride. Among these, preferred are polypropylene, polyethylene, ethylene-propylene copolymer, ethylene-vinyl acetate copolymer, polyamide, polystyrene and polyester.

Among these, it is particularly preferable that the other thermoplastic resin layer is a polyolefin layer and an adhesive resin layer is a carboxylic acid-modified polyolefin layer because the polyolefin layers thus formed can improve mechanical properties of the multilayer structure and improve humidity resistance. It is particularly preferable that polyolefin layers are formed on both outermost layers of the multilayer structure because water absorption of the resin composition layer is effectively prevented. Here, a recovered resin can be added to the polyolefin as long as such an effect is not inhibited.

The multilayer structure can be produced by any of the following methods.

(1) co-extruding the resin composition with the other thermoplastic resin;
(2) melt-extruding the other thermoplastic resin over a molded article made of the resin composition;
(3) co-injecting the resin composition with the other thermoplastic resin;
(4) laminating a molded article made of the resin composition and a molded article made of the other thermoplastic resin by using an adhesive.

Among these, (1) is preferable. A resin composition of the present invention has excellent long run property and allows for preventing discoloration after melt molding even when it is melt-molded under a high-temperature condition. Therefore, even when the resin composition and the other thermoplastic resin with a high melting point are co-extruded, discoloration is prevented and a multilayer structure having excellent appearance can be obtained. Examples of a co-extrusion method include a multimanifold confluence system T die method, a feed Proc confluence system T die method and an inflation method.

The multilayer structure obtained by the above co-extrusion can be secondary-processed to provide, for example, the following molded articles.

(1) A multilayer extension sheet or a multilayer extension film obtained by uniaxial or biaxial drawing of a multilayer structure (for example, sheet, film or the like) while being heated;
(2) A multilayer rolled sheet or a multilayer rolled film obtained by rolling a multilayer structure (for example, sheet, film or the like);
(3) A multilayer tray or a multilayer cup container obtained by thermoforming (vacuum molding, pressure molding, vacuum-pressure molding or the like) a multilayer structure (sheet, film or the like);
(4) a multilayer bottle, a multilayer cup container or the like obtained by stretch blow molding of a multilayer structure (pipe or the like).

These molded articles obtained by secondary processing can be suitably used as a food container such as a deep-drawn container, a cup container and a bottle.

EXAMPLES

There will be further detailed the present invention with reference to Examples.

Example 1

(1) Production of Resin Composition Pellets

First, was prepared EVOH1 in which an ethylene unit content was 32 mol %, a saponification degree was 99.98 mol %, an MFR was 3.8 g/10 min (temperature: 210° C., load: 2160 g), and a water content was 0.2% by mass and which contained sodium acetate as a metal salt at 200 ppm in terms of sodium. As a nonionic surfactant, was prepared an aqueous dispersion in which polyoxyethylene (7) stearyl ether (a number in parentheses in a compound name of a nonionic surfactant denotes a condensation degree of a polyoxyethylene unit. The same applies hereafter.) was dispersed (content of the nonionic surfactant: 10.0 g/L). Then, 100 parts by mass of EVOH1 and 1 part by mass of the aqueous dispersion were blended. The mixture obtained was melt-kneaded under the following conditions, pelletized and then dried, to provide resin corn position pellets.

Apparatus: 25 mmφ twin-screw extruder ("Labo Plastomill 4C150" from Toyo Seiki Kogyo Co., Ltd.)
L/D: 25
Screw: equi-directional complete meshing type
Dice hole number: 2 holes (3 mmφ)
Extrusion temperature: C1=200° C., C2 to C5=220° C., die=220° C.
Drying: vacuum drying at 90° C. for 20 hours (2) Quantification of a Nonionic Surfactant 10 g of the resin composition pellets were dissolved in 1,1,1,3,3,3-hexafluoro-2-propanol, and the solution was added dropwise to methanol. This liquid was filtrated through a filter to remove a precipitate and then concentrated. The concentrate was measured using "UPLC H-Class" from Waters, and a nonionic surfactant content in the EVOH pellets was determined. In this quantification, a calibration curve obtained using each nonionic surfactant was used. A content of polyoxyethylene (7) stearyl ether in the resin composition pellets was 100 ppm.

(3) Evaluation of a Discharge Amount

The resin composition pellets were extruded using a 20 mm extruder "D2020" (D=20 mm, L/D=20, compression ratio=2.0, screw: full flight, from Toyo Seiki Kogyo Co., Ltd.) under the following conditions, to form a monolayer film with a thickness of 20 μm. Here, the amount of a produced monolayer film per hour was evaluated as a discharge amount of the resin composition. A practicable discharge amount is 0.5 kg/hr or more. As the result of the measurement, a discharge amount of the resin composition was 1.6 kg/hr. Conditions for monolayer film production Extrusion temperature: feeding section/compression section/metering section/die=160/180/210/210° C.

Screw speed: 40 rpm

Draw-off roll temperature: 80° C.

(4) Appearance of a Monolayer Film

The monolayer film produced by the above method was winded on a paper core and discoloration of the end face of the film was visually evaluated in accordance with the following criteria. As a result, discoloration of the end face of the film was not observed.

A: Discoloration was not observed.
B: Slight yellowing was observed.
C: Yellowing was observed, but still practically acceptable.
D: Strong yellowing was observed and practically unacceptable.

(5) Adhesiveness of a Multilayer Structure

Using resin composition pellets, a straight-chain low-density polyethylene (LLDPE: ULT-ZEX 2022L from Mitsui Chemicals, Inc.) and an adhesive resin (Bondine TX8030 from SUMICA. ATOCHEM Co. Ltd.; hereinafter, sometimes abbreviated as "Ad"), a multilayer film of three-material, five-layer (LLDPE/Ad/resin composition/Ad/LLDPE=50 μm/10 μm/10 μm/10 μm/50 μm) as described below was produced. The multilayer film obtained was, immediately after forming the multilayer film, cut into a piece of 150 mm in an MD direction×10 mm in a TD direction. Immediately, peel strength between the resin composition layer and the Ad layer was measured by an autograph (DCS-50M from Shimadzu Corporation) in T-type peeling mode, and evaluated in accordance with the following criteria. As a result, adhesion strength was 550 g/15 cm.

(Conditions for Multilayer Forming)

Extruder:
for EVOH: 20 mmφ extruder Lab machine ME type CO-EXT (Toyo Seiki Kogyo Co., Ltd.)
for Ad: 25 mmφ extruder P25-18AC (Osaka Seiki)
for LLDPE: 32 mmφ extruder GF-32-A (Research Laboratory of Plastics Technology Co., Ltd.)

EVOH extrusion temperature: feeding section/compression section/metering section/die=175/210/220/220° C.

Ad extrusion temperature: feeding section/compression section/metering section/die=100/160/220/220° C.

LLDPE extrusion temperature: feeding section/compression section/metering section/die=150/200/210/220° C.

Die: 300 mm width coat hanger die (Research Laboratory of Plastics Technology Co., Ltd.)

(Criteria for Evaluation of Adhesiveness)

A: 600 g/15 cm or more
B: 450 g/15 cm or more and less than 600 g/15 cm
C: 300 g/15 cm or more and less than 450 g/15 cm
D: less than 300 g/15 cm Examples 2 to 33 and Comparative Examples 1 to 6

Resin composition pellets, monolayer films and multilayer structures were produced as described in Example 1, except that the type of an EVOH, and the type and the content of a nonionic surfactant were changed as shown in Tables 1 and 2, and analyzed and evaluated. The results are shown in Table 2.

TABLE 1

| | Ethylene unit content (mol %) | Saponification degree (mol %) | MFR[1] (g/10 min) | Water content (% by mass) | Sodium content (ppm) |
|---|---|---|---|---|---|
| EVOH1 | 32 | 99.98 | 3.8 | 0.2 | 200 |
| EVOH2 | 24 | 99.98 | 2.2 | 0.2 | 200 |
| EVOH3 | 48 | 99.98 | 15 | 0.2 | 200 |
| EVOH4 | 32 | 88 | 4.0 | 0.2 | 200 |
| EVOH5 | 29 | 99.98 | 4.0 | 0.2 | 200 |
| EVOH6 | 32 | 99.98 | 3.8 | 0.2 | 0[2] |
| EVOH7 | 32 | 99.98 | 3.8 | 0.2 | 600 |
| EVOH8 | 32 | 99.98 | 3.8 | 0.2 | 340 |

[1]temperature: 210° C., load: 2160 g
[2]equal to or smaller than lower detection limit

TABLE 2

| | EVOH | Surfactant Type | Content (ppm) | Discharge amount kg/hr | Appearance | Adhesiveness |
|---|---|---|---|---|---|---|
| Example 1 | EVOH1 | Polyoxyethylene(7) stearyl ether | 100 | 1.6 | A | B |
| Example 2 | EVOH1 | Polyoxyethylene(7) stearyl ether | 3 | 1.0 | B | B |
| Example 3 | EVOH1 | Polyoxyethylene(7) stearyl ether | 15 | 1.3 | A | B |
| Example 4 | EVOH1 | Polyoxyethylene(7) stearyl ether | 50 | 1.4 | A | B |
| Example 5 | EVOH1 | Polyoxyethylene(7) stearyl ether | 180 | 1.5 | A | B |
| Example 6 | EVOH1 | Polyoxyethylene(7) stearyl ether | 280 | 1.4 | A | B |
| Example 7 | EVOH1 | Polyoxyethylene(7) stearyl ether | 400 | 0.7 | B | B |
| Example 8 | EVOH6 | Polyoxyethylene(7) stearyl ether | 100 | 1.6 | A | D |
| Example 9 | EVOH7 | Polyoxyethylene(7) stearyl ether | 100 | 1.6 | C | A |
| Example 10 | EVOH8 | Polyoxyethylene(7) stearyl ether | 100 | 1.6 | B | A |
| Example 11 | EVOH1 | Polyoxyethylene(15) oleyl ether | 100 | 1.4 | A | B |
| Example 12 | EVOH1 | Polyoxyethylene(4) lauryl ether | 100 | 1.6 | A | B |
| Example 13 | EVOH1 | Polyoxyethylene(5) oleyl ether | 100 | 1.5 | A | B |
| Example 14 | EVOH1 | Polyoxyethylene(2) oleyl ether | 100 | 1.2 | B | B |
| Example 15 | EVOH1 | Polyoxyethylene(4)-2-ethylhexyl ether | 100 | 1.3 | A | B |
| Example 16 | EVOH1 | Polyoxypropylene stearyl ether[1] | 100 | 0.6 | A | B |
| Example 17 | EVOH1 | Polyoxyethylene-polyoxypropylene-alkyl ether[2] | 100 | 1.4 | A | B |
| Example 18 | EVOH1 | Polyoxyethylene styrenated phenyl ether[3] | 100 | 1.4 | A | B |
| Example 19 | EVOH1 | Polyoxyethylenestearylamine[4] | 100 | 1.5 | C | B |
| Example 20 | EVOH1 | Polyoxyethylene-polyoxypropylene-laurylamine[5] | 100 | 1.5 | C | B |

TABLE 2-continued

| | EVOH | Surfactant Type | Content (ppm) | Discharge amount kg/hr | Appearance | Adhesiveness |
|---|---|---|---|---|---|---|
| Example 21 | EVOH1 | Polyoxyethylene monolaurate[6] | 100 | 1.4 | A | B |
| Example 22 | EVOH1 | Polyoxyethylene monostearate[7] | 100 | 1.6 | A | B |
| Example 23 | EVOH1 | Polyoxyethylene monolaurate[8] | 100 | 1.5 | B | B |
| Example 24 | EVOH1 | Polyethylene glycol dioleate[9] | 100 | 1.5 | B | B |
| Example 25 | EVOH1 | Polyoxyethylene sorbitan monostearate[10] | 100 | 1.4 | C | B |
| Example 26 | EVOH1 | Sorbitan monocaprylate[11] | 100 | 1.4 | C | B |
| Example 27 | EVOH1 | Diglycerol laurate | 100 | 1.4 | A | B |
| Example 28 | EVOH1 | Oleic acid diethanolamide | 100 | 1.3 | B | B |
| Example 29 | EVOH1 | Polyoxyethylene(7) stearyl ether/ Polyoxyethylene(2) oleyl ether | 50/50 | 1.5 | A | B |
| Example 30 | EVOH2 | Polyoxyethylene(7) stearyl ether | 100 | 1.3 | B | A |
| Example 31 | EVOH2 | Polyoxyethylene(7) stearyl ether | 280 | 1.1 | C | A |
| Example 32 | EVOH3 | Polyoxyethylene(7) stearyl ether | 100 | 1.6 | A | C |
| Example 33 | EVOH3 | Polyoxyethylene(7) stearyl ether | 280 | 1.6 | A | C |
| Comparative Example 1 | EVOH1 | — | 0 | 0.1 | D | B |
| Comparative Example 2 | EVOH4 | Polyoxyethylene(7) stearyl ether | 100 | 1.5 | D | C |
| Comparative Example 3 | EVOH1 | Polyoxyethylene(7) stearyl ether | 1600 | 0.4 | D | C |
| Comparative Example 4 | EVOH5 | Diglycerol laurate | 5000 | 0.3 | D | D |
| Comparative Example 5 | EVOH5 | Tetraglycerol stearate | 10000 | 0.3 | D | D |
| Comparative Example 6 | EVOH5 | Tetraglycerol stearate/ Polyoxyethylene(3) lauryl ether | 7500/7500 | 0.2 | D | D |

[1]"Unilube MS-70K" from NOF Corporation,
[2]"Nonion HT-510" from NOF Corporation,
[3]"Noigen EA-157" from DKS Co., Ltd.,
[4]"Nymeen S-210" from NOF Corporation,
[5]"Nymeen L-703" from NOF Corporation,
[6]"Nonion L-4" from NOF Corporation,
[7]"Nonion S-4" from NOF Corporation,
[8]"Nonion L-2" from NOF orporation,
[9]"Nonion DO-6" from NOF Corporation,
[10]"Sorgen TW-60" from DKS Co., Ltd.,
[11]"Sorgen 110" from DKS Co., Ltd.

Example 34

An aqueous dispersion of EVOH1 and a nonionic surfactant was prepared as described in Example 1. 100 parts by mass of EVOH1, 1 part by mass of the aqueous dispersion and 0.5 parts by mass of N,N'-hexane-1,6-diylbis[3-(3,5-di-tert-butyl-4-hydroxyphenyl)propionamide] as an antioxidant were blended. Resin composition pellets, a monolayer film and a multilayer structure were produced as described in Example 1, except that the mixture thus obtained was used, and analyzed and evaluated. The results are shown in Table 3.

Examples 35 to 48

Resin composition pellets, monolayer films and multilayer structures were produced as described in Example 34, except that the amount of a nonionic surfactant and the type and the amount of an additive were changed as shown in Table 3, and analyzed and evaluated. The results are shown in Table 3.

Examples 49 and 50

Resin composition pellets, monolayer films and multilayer structures were produced as described in Example 1, except that 85 parts by mass of EVOH1 and 15 parts by mass of EVOH3 (ethylene content: 48 mol %, saponification degree: 99.98 mol %, MFR: 15 g/10 min (temperature: 210° C., load: 2160 g), water content: 0.2% by mass) were used in place of 100 parts by mass of EVOH1 and a content of a nonionic surfactant was changed as shown in Table 3, and analyzed and evaluated. The results are shown in Table 3.

TABLE 3

| | EVOH | Surfactant Type | Content (ppm) | Additive Type[2] | Amount (parts by mass) | Discharge amount kg/hr | Appearance | Adhesiveness |
|---|---|---|---|---|---|---|---|---|
| Example 34 | EVOH1 | Polyoxyethylene(7) stearyl ether | 100 | 1 | 0.5 | 1.6 | A | C |

TABLE 3-continued

| | | Surfactant | | Additive | | Discharge amount kg/hr | Appearance | Adhesiveness |
|---|---|---|---|---|---|---|---|---|
| | EVOH | Type | Content (ppm) | Type[2)] | Amount (parts by mass) | | | |
| Example 35 | EVOH1 | Polyoxyethylene(7) stearyl ether | 180 | 1 | 0.5 | 1.5 | A | C |
| Example 36 | EVOH1 | Polyoxyethylene(7) stearyl ether | 280 | 1 | 0.7 | 1.4 | A | C |
| Example 37 | EVOH1 | Polyoxyethylene(7) stearyl ether | 100 | 2 | 0.5 | 1.6 | A | C |
| Example 38 | EVOH1 | Polyoxyethylene(7) stearyl ether | 100 | 3 | 0.5 | 1.5 | A | C |
| Example 39 | EVOH1 | Polyoxyethylene(7) stearyl ether | 280 | 3 | 0.5 | 1.3 | A | C |
| Example 40 | EVOH1 | Polyoxyethylene(7) stearyl ether | 100 | 4 | 0.5 | 1.6 | A | C |
| Example 41 | EVOH1 | Polyoxyethylene(7) stearyl ether | 280 | 4 | 0.5 | 1.4 | A | C |
| Example 42 | EVOH1 | Polyoxyethylene(7) stearyl ether | 100 | 5 | 0.5 | 1.5 | B | C |
| Example 43 | EVOH1 | Polyoxyethylene(7) stearyl ether | 280 | 5 | 0.5 | 1.3 | B | C |
| Example 44 | EVOH1 | Polyoxyethylene(7) stearyl ether | 100 | 6 | 0.02 | 1.5 | A | C |
| Example 45 | EVOH1 | Polyoxyethylene(7) stearyl ether | 280 | 6 | 0.02 | 1.3 | A | C |
| Example 46 | EVOH1 | Polyoxyethylene(7) stearyl ether | 400 | 6 | 0.01 | 0.8 | B | C |
| Example 47 | EVOH1 | Polyoxyethylene(7) stearyl ether | 100 | 7 | 0.5 | 1.5 | B | C |
| Example 48 | EVOH1 | Polyoxyethylene(7) stearyl ether | 280 | 7 | 0.5 | 1.3 | B | C |
| Example 49 | EVOH1(85)[1)] EVOH3(15)[1)] | Polyoxyethylene(7) stearyl ether | 100 | — | — | 1.4 | A | C |
| Example 50 | EVOH1(85)[1)] EVOH3(15)[1)] | Polyoxyethylene(7) stearyl ether | 280 | — | — | 1.2 | A | C |

[1)]parts by mass
[2)]1 Antioxidant A: N,N'-hexane-1,6-diylbis[3-(3,5-di-tert-butyl-4-hydroxyphenyl)propionamide]
2 Antioxidant B: N,N'-1,6-hexanediylbis[N-(2,2,6,6-tetramethyl-4-piperidinyl)-formamide]
3 Ultraviolet absorber: ethylene-2-cyano-3,3'-diphenyl acrylate
4 Plasticizer: dimethyl phthalate
5 Antistatic: pentaerythritol monostearate
6 Lubricant: ethylenebisstearamide
7 Filler: talc Example 51

A multilayer film consisting of five layers, that is, polypropylene layer (200 μm)/adhesive resin layer (25 μm)/resin composition layer (50 μm)/adhesive resin layer (25 μm)/polypropylene layer (200 μm), was produced from the resin composition pellets obtained in Example 1, using a co-extruder for three-material, five-layer. Here, the adhesive resin was maleic anhydride-modified polypropylene. Appearance of the multilayer film thus obtained was evaluated as described in Example 1, and discoloration of the end face of the film was not observed.

Comparative Example 7

A multilayer film was produced and appearance was evaluated as described in Example 51, except that the resin composition pellets obtained in Comparative Example 1 was used. The end face of the film was strongly yellowed and the film was practically unacceptable.

The invention claimed is:
1. A resin composition, comprising an ethylene-vinyl alcohol copolytiier and a nonionic surfactant,
wherein the ethylene-vinyl alcohol copolymer has an ethylene unit content of 15 to 60 mol %, and a saponification degree of 99 mol % or more;
the ethylene-vinyl alcohol copolymer is in an amount of 55% by mass or more;
the nonionic surfactant is at least one selected from the group consisting of ethers, aminoethers, esters, esters/ethers and amides and is contained at 3 to 400 ppm;
the nonionic surfactant is dispersed in the ethylene-vinyl alcohol copolymer; and
the resin composition is produced by melt-kneading a mixture comprising the non-ionic surfactant, water, and the ethylene-vinyl alcohol copolymer.
2. The resin composition according to claim 1, wherein the nonionic surfactant is at least one selected from the group consisting of polyoxyalkylene alkyl ethers, polyoxyalkylene alkenyl ethers, polyoxyethylene styrenated-phenyl ethers, polyoxyalkylenealkylamines, polyoxyalkylenealkenylamines, polyoxyalkylene alkyl esters, polyoxyalkylene alkenyl esters, sorbitan alkyl esters, sorbitan alkenyl esters, polyoxyethylene sorbitan alkyl esters, polyoxyethylene sorbitan alkenyl esters, glycerol alkyl esters, glycerol alkenyl esters, polyglycerol alkyl esters, polyglycerol alkenyl esters and higher fatty acid amides.
3. The resin composition according to claim 1, further comprising an alkali metal salt at 10 to 500 ppm in terms of the metal element.
4. The resin composition according to claim 1, further comprising at least one additive selected from the group consisting of an antioxidant, an ultraviolet absorber, a plasticizer, an antistatic, a lubricant and a filler at 0.005 to 1% by mass.

5. The resin composition according to claim 1, comprising two further ethylene-vinyl alcohol copolymers having different ethylene unit contents as the ethylene-vinyl alcohol copolymer.

6. A molded article comprising the resin composition according to claim 1.

7. A multilayer structure comprising a layer comprising the resin composition according to claim 1 and a layer comprising a thermoplastic resin other than the ethylene-vinyl alcohol copolymer.

8. A method for producing the resin composition according to claim 1, comprising melt-kneading a mixture comprising the nonionic surfactant, water and the ethylene-vinyl alcohol copolymer.

9. The production method according to claim 8, wherein in the mixture, a water content is 0.1 to 50 parts by mass based on 100 parts by mass of the ethylene-vinyl alcohol copolymer.

10. The production method according to claim 8, wherein an aqueous solution or an aqueous dispersion comprising the nonionic surfactant is added to the ethylene-vinyl alcohol copolymer to obtain the mixture.

* * * * *